(12) United States Patent
Lyndon et al.

(10) Patent No.: US 12,186,731 B2
(45) Date of Patent: Jan. 7, 2025

(54) METAL ORGANIC FRAMEWORK MATERIALS AND USES FOR SUCH

(71) Applicant: Georgia Tech Research Corporation, Atlanta, GA (US)

(72) Inventors: Richelle Lyndon, Atlanta, GA (US); Ryan Paul Lively, Atlanta, GA (US); David Scott Sholl, Marietta, GA (US); Wenqin You, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 306 days.

(21) Appl. No.: 17/637,326

(22) PCT Filed: Aug. 28, 2020

(86) PCT No.: PCT/US2020/048327
§ 371 (c)(1),
(2) Date: Feb. 22, 2022

(87) PCT Pub. No.: WO2021/041761
PCT Pub. Date: Mar. 4, 2021

(65) Prior Publication Data
US 2022/0280914 A1     Sep. 8, 2022

Related U.S. Application Data

(60) Provisional application No. 62/893,485, filed on Aug. 29, 2019.

(51) Int. Cl.
*B01J 20/22*      (2006.01)
*B01D 53/02*     (2006.01)
*C07C 7/12*       (2006.01)

(52) U.S. Cl.
CPC ............ *B01J 20/226* (2013.01); *B01D 53/02* (2013.01); *B01D 2253/204* (2013.01); *B01D 2256/24* (2013.01); *B01D 2257/7022* (2013.01)

(58) Field of Classification Search
None
See application file for complete search history.

(56) References Cited

U.S. PATENT DOCUMENTS

2013/0197235 A1    8/2013   Thompson et al.

FOREIGN PATENT DOCUMENTS

CN            107474060 A   * 12/2017   ............ B01J 20/226

OTHER PUBLICATIONS

Chinese Second Office Action, dated Jul. 27, 2023, pertaining to Chinese Patent Application No. 202080063804.X, 7 pgs.
(Continued)

*Primary Examiner* — Daniel Berns
(74) *Attorney, Agent, or Firm* — Dinsmore & Shohl LLP

(57) ABSTRACT

The present disclosure is directed to metal organic framework materials and uses for such metal organic framework materials. According to one embodiment, a metal organic framework material may include zinc ions, one or more triazoles, and one or more imidazoles. At least a portion of the zinc ions may be coordinated by the triazoles and the imidazoles such that at least a portion of the metal organic framework material forms a crystalline structure belonging to a monoclinic crystal system.

15 Claims, 12 Drawing Sheets

(56) References Cited

OTHER PUBLICATIONS

International Search Report and Written Opinion issued in corresponding PCT Patent Application No. PCT/US2020/048327, mailed Dec. 2, 2020.

Jiang, J. Q., Yang, C. X., & Yan, X. P. (2015). Postsynthetic ligand exchange for the synthesis of benzotriazole-containing zeolitic imidazolate framework. Chemical Communications, 51(30), 6540-6543.

Erkartal, M., Erkilic, U., Tam, B., Usta, H., Yazaydin, O., Hupp, J. T., . . . & Sen, U. (2017). From 2-methylimidazole to 1, 2, 3-triazole: a topological transformation of ZIF-8 and ZIF-67 by post-synthetic modification. Chemical Communications, 53(12), 2028-2031.

Lyndon et al. "Tuning the Structures of Metal-Organic Frameworks via a Mixed-Linker Strategy for Ethylene/Ethane Kinetic Separation" Chemistry of Materials, vol. 32, No. 9, Apr. 16, 2020, pp. 3715-3722.

Bachman, J. E., & Long, J. R. (2016). Plasticization-resistant Ni 2 (dobdc)/polyimide composite membranes for the removal of CO 2 from natural gas. Energy & Environmental Science, 9(6), 2031-2036.

Banerjee, A., Nandi, S., Nasa, P., & Vaidhyanathan, R. (2016). Enhancing the carbon capture capacities of a rigid ultra-microporous MOF through gate-opening at low CO 2 pressures assisted by swiveling oxalate pillars. Chemical Communications, 52(9), 1851-1854.

Bao, Z., Alnemrat, S., Yu, L., Vasiliev, I., Ren, Q., Lu, X., & Deng, S. (2011). Adsorption of ethane, ethylene, propane, and propylene on a magnesium-based metal-organic framework. Langmuir, 27(22), 13554-13562.

Bux, H., Chmelik, C., Krishna, R., & Caro, J. (2011). Ethene/ethane separation by the MOF membrane ZIF-8: molecular correlation of permeation, adsorption, diffusion. Journal of membrane science, 369(1-2), 284-289.

Cadiau, A., Adil, K., Bhatt, P. M., Belmabkhout, Y., & Eddaoudi, M. (2016). A metal-organic framework-based splitter for separating propylene from propane. Science, 353(6295), 137-140.

Das, M. C., Guo, Q., He, Y., Kim, J., Zhao, C. G., Hong, K., . . . & Chen, B. (2012). Interplay of metalloligand and organic ligand to tune micropores within isostructural mixed-metal organic frameworks (M' MOFs) for their highly selective separation of chiral and achiral small.

Gándara, F., Uribe-Romo, F. J., Britt, D. K., Furukawa, H., Lei, L., Cheng, R., . . . & Yaghi, O. M. (2012). Porous, Conductive Metal-Triazolates and Their Structural Elucidation by the Charge-Flipping Method. Chemistry—A European Journal, 18(34), 10595-10601.

He, C. T., Ye, Z. M., Xu, Y. T., Zhou, D. D., Zhou, H. L., Chen, D., . . . & Chen, X. M. (2017). Hyperfine adjustment of flexible pore-surface pockets enables smart recognition of gas size and quadrupole moment. Chemical science, 8(11), 7560-7565.

Herm, Z. R., Bloch, E. D., & Long, J. R. (2013). Hydrocarbon separations in metal-organic frameworks. Chemistry of Materials, 26(1), 323-338.

Kwon, H. T., & Jeong, H. K. (2013). In situ synthesis of thin zeolitic-imidazolate framework ZIF-8 membranes exhibiting exceptionally high propylene/propane separation. Journal of the American Chemical Society, 135(29), 10763-10768.

Liao, P. Q., Zhang, W. X., Zhang, J. P., & Chen, X. M. (2015). Efficient purification of ethene by an ethane-trapping metal-organic framework. Nature communications, 6, 8697.

Lin, R. B., Chen, D., Lin, Y. Y., Zhang, J. P., & Chen, X. M. (2012). A zeolite-like zinc triazolate framework with high gas adsorption and separation performance. Inorganic chemistry, 51(18), 9950-9955.

Liu, B., Zhou, H. F., Hou, L., Zhu, Z., & Wang, Y. Y. (2016). A chiral metal-organic framework with polar channels: unique interweaving six-fold helices and high CO2/CH 4 separation. Inorganic Chemistry Frontiers, 3(10), 1326-1331.

Peng, J., Wang, H., Olson, D. H., Li, Z., & Li, J. (2017). Efficient kinetic separation of propene and propane using two microporous metal organic frameworks. Chemical Communications, 53(67), 9332-9335.

Pimentel, B. R., & Lively, R. P. (2016). Enabling kinetic light hydrocarbon separation via crystal size engineering of ZIF-8. Industrial & Engineering Chemistry Research, 55(48), 12467-12476.

Schneemann, A., Bon, V., Schwedler, I., Senkovska, I., Kaskel, S., & Fischer, R. A. (2014). Flexible metal-organic frameworks. Chemical Society Reviews, 43(16), 6062-6096.

Xiang, S. C., Zhang, Z., Zhao, C. G., Hong, K., Zhao, X., Ding, D. R., . . . & Thomas, K. M. (2011). Rationally tuned micropores within enantiopure metal-organic frameworks for highly selective separation of acetylene and ethylene. Nature communications, 2, 204.

Zhang, J. P., & Chen, X. M. (2008). Exceptional framework flexibility and sorption behavior of a multifunctional porous cuprous triazolate framework. Journal of the American Chemical Society, 130(18), 6010-6017.

Yue et al. "A Flexible Metal-Organic Framework: Guest Molecules Controlled Dynamic Gas Adsorption", U.S. Department of Energy, Office of Science, Basic Energy Sciences, Chemical Sciences, Geo-sciences, and Biosciences Division, pp. 1-24.

\* cited by examiner

METAL ORGANIC FRAMEWORK MATERIALS AND USES FOR SUCH

CROSS-REFERENCE TO RELATED APPLICATIONS

This application is a U.S. National Stage Application corresponding to International Patent Application No. PCT/US2020/048327 filed Aug. 28, 2020 and claims priority to U.S. Provisional Patent Application No. 62/893,485, filed on Aug. 29, 2019, the entire disclosure of which is hereby incorporated by reference.

TECHNICAL FIELD

The present disclosure generally relates to metal organic framework materials, and more specifically, to metal organic framework material suitable for the kinetic separation of hydrocarbons.

BACKGROUND

Various chemical processes utilize or produce streams with two or more gas chemical species. It may be desirable to separate such chemical species to attain, for example, a purified stream of a chosen chemical species. However, separation of similar chemical species may be difficult and costly.

SUMMARY

There is a need for materials and techniques which may be utilized to separate chemical species in a stream. For example, streams containing relatively light alkanes and alkenes (e.g, C2-C6) may be produced by processes such as dehydrogenation, hydrogenation, etc., and may be downstream separated to form streams containing primarily of one or a group of chemical species. Described herein are metal organic framework materials which may be useful for such separation. The presently disclosed metal organic framework materials may be formed from the combination of metal ions, triazoles, and imidazoles, and may exhibit a crystalline structure different from other known metal organic framework materials. Such metal organic framework materials may be utilized for kinetic separation of chemical species in a stream and may, in some embodiments, provide superior separation performance as compared with conventional metal organic framework materials.

In one or more embodiments, a metal organic framework material that may be suitable for the kinetic separation of hydrocarbons may comprise metal ions, one or more triazoles, and one or more imidazoles. At least a portion of the metal ions may be coordinated by the one or more triazoles and the one or more imidazoles such that at least a portion of the metal organic framework material forms a crystalline structure belonging to a monoclinic crystal system.

According to one or more additional embodiments, hydrocarbons may be kinetically separated by a method that may comprise contacting hydrocarbons with a metal organic framework material such that a first portion of the hydrocarbons are adsorbed by the metal organic framework material and a second portion of the hydrocarbons are not adsorbed by the metal organic framework. The metal organic framework material may comprise metal ions, one or more triazoles, and one or more imidazoles. At least a portion of the metal ions may be coordinated by the one or more triazoles and the one or more imidazoles such that at least a portion of the metal organic framework material forms a crystalline structure belonging to a monoclinic crystal system.

In one or more embodiments, a metal organic framework material that may be suitable for the kinetic separation of hydrocarbons may comprise zinc ions, 1,2,3-benzotriazole, and benzimidazole. At least a portion of the zinc ions may be coordinated by the 1,2,3-benzotriazole and the benzimidazole such that at least a portion of the metal organic framework material forms a crystalline structure belonging to a monoclinic crystal system. The molar ratio of 1,2,3-benzotriazole to benzimidazole may be from 65:35 to 75:25. At least 95 wt. % of the metal organic framework material may be the combination of zinc ions, the 1,2,3-benzotriazole, and the benzimidazole.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
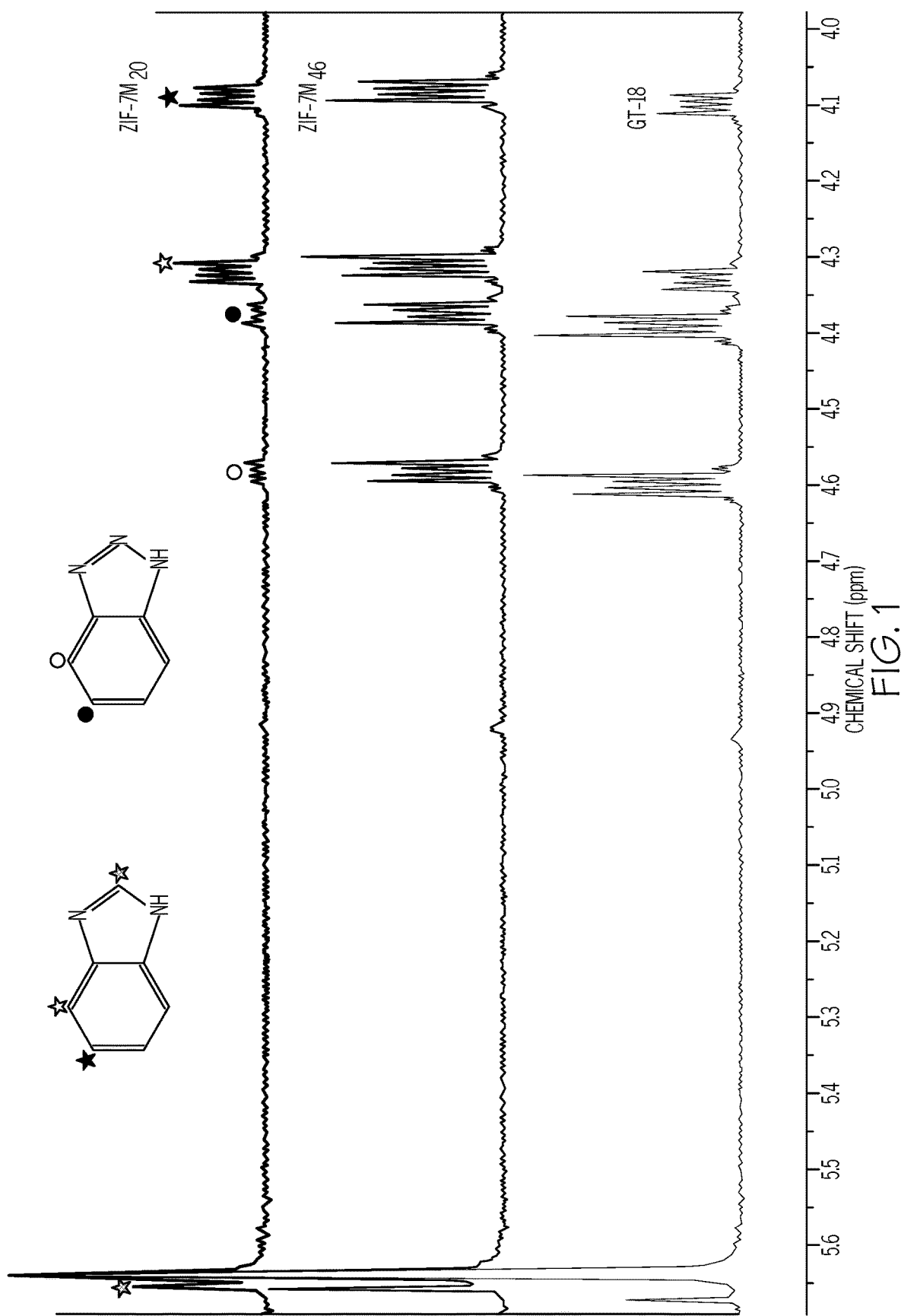
FIG. 1 depicts the $^1$H NMR spectra for the samples of Example 3, according to one or more embodiments shown and described herein.

Reference will now be made in greater detail to various embodiments, some embodiments of which are illustrated in the accompanying drawings. Whenever possible, the same reference numerals will be used throughout the drawings to refer to the same or similar parts.

In one or more embodiments, the presently disclosed metal organic framework material may comprise one or more of metal ions, triazoles, and imidazoles. As described herein, metal organic frameworks (MOFs) may refer to a class of compounds consisting of metal ions or clusters coordinated to organic ligands to form one-, two-, or three-dimensional structures. They are generally considered a subclass of coordination polymers, with the special feature that they are often porous. The organic ligands included are sometimes referred to as "linkers" or "struts."

According to one or more embodiments, metal ions, triazoles, and imidazoles may form materials including such metal organic frameworks. Metal ions generally refer to charged metal atoms which may be derived from precursor materials. Triazoles and imidazoles may refer to a molecules comprising triazole and imidazole functional groups, respectively. A triazole functional group may refer to any of the heterocyclic compounds with molecular formula $C_2H_3N_3$, having a five-membered ring of two carbon atoms and three nitrogen atoms. Imidazoles functional groups may refer to organic compounds with the formula $C_3N_2H_4$.

According to embodiments disclosed herein, at least a portion of the metal ions may be coordinated by the triazole and the imidazole. In such embodiments, at least a portion of, or substantially all of, the metal organic framework material may form a crystalline structure. A crystalline structure or material may refer to a solid material whose constituents (such as atoms, molecules, or ions) are arranged in a highly ordered microscopic structure, forming a crystal lattice that extends in all directions. Generally, a crystal structure may be described or characterized by the ordered arrangement of atoms, ions or molecules in a crystalline material, as is described in further detail herein.

In the crystal structures of the presently disclosed metal organic framework structure, the metal ions may be center constituents of the metal organic framework, and the triazole and imidazole may each be linkers in the metal organic framework. As described herein, "linkers" may refer to organic molecules that bind to the metal ions in a metal organic framework material. Center constituents may refer to the metal ions to which such linkers bind.

In one or more embodiments, at least a portion of the triazoles are 1,2,3-benzotriazole. For example, at least 50 mol. %, at least 60 mol. %, at least 70 mol. %, at least 80 mol. %, at least 90 mol. %, at least 95 mol. %, at least 99 mol. %, or even at least 99.9 mol. % of the triazole may be 1,2,3-benzotriazole. The chemical structure of 1,2,3-benzotriazole is depicted below in Chemical Structure #1.

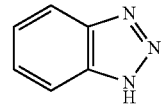

Chemical Structure #1

In one or more embodiments, at least a portion of the imidazoles are benzimidazole. For example, at least 50 mol. %, at least 60 mol. %, at least 70 mol. %, at least 80 mol. %, at least 90 mol. %, at least 95 mol. %, at least 99 mol. %, or even at least 99.9 mol. % of the imidazole may be benzimidazole. The chemical structure of benzimidazole is depicted below in Chemical Structure #2.

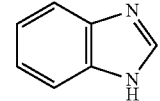

Chemical Structure #2

According to one or more embodiments, the metal organic framework material may comprise at least 50 wt. %, at least 60 wt. %, at least 70 wt. %, at least 80 wt. %, at least 90 wt. %, at least 95 wt. %, at least 99 wt. %, or even at least 99.9 wt. % of the combination of center constituents and linkers. For example, the metal organic framework material may comprise at least 50 wt. %, at least 60 wt. %, at least 70 wt. %, at least 80 wt. %, at least 90 wt. %, at least 95 wt. %, at least 99 wt. %, or even at least 99.9 wt. % of the combination of metal ions, triazoles, and imidazoles. In additional embodiments, the metal organic framework material may comprise at least 50 wt. %, at least 60 wt. %, at least 70 wt. %, at least 80 wt. %, at least 90 wt. %, at least 95 wt. %, at least 99 wt. %, or even at least 99.9 wt. % of the combination of metal ions, 1,2,3-benzotriazole, and benzimidazole.

According to embodiments disclosed herein, the molar ratio of triazole to imidazole may be from 60:40 to 80:20. For example, the molar ratio of triazole to imidazole may be from 65:35 to 75:25, or from 78:32 to 72:28. In one or more embodiments, the molar ratio of 1,2,3-benzotriazole to benzimidazole may be from 60:40 to 80:20. For example, the molar ratio of 1,2,3-benzotriazole to benzimidazole may be from 65:35 to 75:25, or from 68:32 to 72:28. Without being bound by theory, it is believed that the ratio of triazole to imidazole may affect the crystal structure of the formed metal organic framework. For example, in one or more embodiments, the presently disclosed molar ratios of triazole to imidazole may form metal organic frameworks belonging to a monoclinic crystal system, as can be appreciated from the examples which follow.

In one or more embodiments, the molar ratio of metal ions to linkers, such as the triazole and imidazole, may be from 1:1 to 1:4, such as from 1:1 to 1:2. In additional embodiments, the molar ratio of metal ion to the sum of 1,2,3-benzotriazole, and benzimidazole may be from 1:1 to 1:4 to, such as from 1:1 to 1:2.

According to one or more embodiments presently described, at least a portion of the metal ions may be chosen from ions of Fe, Ru, Os, Hs, Co, Rh, Ir, Ni, Pd, Pt, Cu, Ag, Au, Zn, Cd, Hg, Cn, Ga, In, Ti, Nh, or combinations thereof. In embodiments, at least 25 wt. %, at least 50 wt. %, at least 75 wt. %, at least 95 wt. %, at least 99 wt. %, or substantially all of the metal oxide may be one or a combination of ions of Fe, Ru, Os, Hs, Co, Rh, Ir, Ni, Pd, Pt, Cu, Ag, Au, Zn, Cd, Hg, Cn, Ga, In, Ti, or Nh.

The crystalline structure of the presently described metal organic framework materials may belong to a monoclinic crystal system. As described herein, crystalline space groups describe combinations of the 32 crystallographic point groups with the 14 Bravais Lattices taking into account symmetries of reflection, rotation and improper rotation, screw axis symmetry, and glide plane symmetry. There are 230 space groups describing possible crystal symmetries. In one or more embodiments, at least a portion of the metal organic framework material forms a crystalline structure belonging to the $P2_1$ space group.

In one or more embodiments, at least a portion of the metal organic framework material forms a crystalline structure that has a rod morphology. As described herein, a morphology refers to the external shape of a crystal. A crystal with a rod morphology may have an external shape resembling a rod or cylinder.

In one or more embodiments, at least a portion of the metal ions are coordinated by the triazole linkers and imidazole linkers such that the metal ions have a coordination number of 4. As described herein, the coordination number represents the number of atoms, molecules, or ions connected to a central atom, molecule, or ion.

In one or more embodiments, at least a portion of the metal organic framework material forms a crystalline structure that has a Flack parameter of from 0.0 to 0.1, such as from 0.0 to 0.05. The Flack parameter may be useful for determining the absolute configuration of a crystal structure. Without being bound by any particular theory, if the value of the Flack parameter is near 0.0, then the absolute structure is likely correct. If the value of the Flack parameter is near 1.0, then the inverted structure is likely correct, and if the value is near 0.5, then the crystal may be a racemic mixture.

Various embodiments of the metal organic framework material described herein may be made by a method that may include dissolving a metal precursor into a solvent, adding triazole and imidazole to the metal solution, stirring the reaction mixture at room temperature for multiple days, centrifuging the reaction mixture to obtain a the metal organic framework material in powder form, washing the metal organic framework material with a solvent, and activating the metal organic framework material. The metal precursor may be any compound known in the art capable of producing metal ions when dissolved in the solvent. For example, suitable zinc precursors may include zinc acetate, zinc nitrate hexahydrate, zinc oxide, zinc halide.

It should be understood that other methods may be utilized for forming the metal organic frameworks presently disclosed, as would be understood by one having skill in the art. The presently disclosed metal organic frameworks should be construed to be limited by any particular method of synthesis.

In one or more embodiments, the solvent may include dimethylformamide (DMF), ethanol, deionized water, ammonium hydroxide, and combinations thereof. In certain embodiments the solvent comprises DMF, ethanol, deionized water, and ammonium hydroxide in a volume ratio of 5:5:7.5:2.5.

In one or more embodiments, the triazole and imidazole may be added to the metal solution in a molar ratio between 70:30 and 90:10. For example, the molar ratio of triazole to imidazole may be between 75:25 and 85:15, or from 78:22 to 82:18. In certain embodiments, the triazole and imidazole are 1,2,3-benzotriazole and benzimidazole. In such embodiments, the molar ratio of 1,2,3-benzotriazole to benzimidazole may be from 70:30 to 90:10. For example, the molar ratio of 1,2,3-benzotriazole to benzimidazole may be 75:25 to 85:15, or from 78:22 to 82:18.

It should be appreciated that, in some embodiments, a greater amount of triazole relative to imidazole may be added during synthesis to result in a metal organic framework material with a lesser amount of triazole relative to imidazole. For example, utilizing a ratio of approximately 80:20 of triazole to imidazole in solution during synthesis may result in a ratio of approximately 70:30 of triazole to imidazole in the final metal organic framework material.

As described herein, stirring the reaction mixture may occur for multiple days. For example, the drying step may take place over at least 1, at least 2, at least 3, at least 4, at least 5, at least 6, at least 7, or even at least 8 days. Additionally, activating the metal organic framework material may occur at elevated temperature under vacuum. For example, activation may occur at a temperature of at least 150° C., at least 160° C., at least 170° C., at least 180° C., at least 190° C., at least 200° C., at least 210° C., at least 220° C., at least 230° C., at least 240° C., or even at least 250° C. Activation may occur for at least 20 hours, at least 22 hours, at least 24 hours, at least 26 hours, or even at least 28 hours.

In one or more embodiments, a chemical stream may include constituents that may be desirable when separated from one another. One method for separating these constituents is adsorptive separation. During adsorptive separation, the constituents may be separated when one or more of the constituents adsorbs more readily onto an adsorbent material and one or more of the constituents adsorbs less readily onto the adsorbent material. In one or more embodiments, the adsorbent material may be a metal organic framework material, such as the embodiments disclosed herein. The selectivity of the adsorbent material is a measure of the competitiveness of adsorption between the constituents in the chemical stream. The adsorptive separation may be referred to as kinetic separation when the difference in the adsorption rate of the constituents controls the selectivity of the adsorbent material.

In one or more embodiments, a method for the kinetic separation of hydrocarbons may include contacting hydrocarbons with a metal organic framework material such that a first portion of the hydrocarbons are adsorbed by the metal organic framework material and a second portion of the hydrocarbons are not adsorbed by the metal organic framework. The portion of the hydrocarbons not adsorbed by the metal organic framework may be collected. Afterwards, the first portion of the hydrocarbons may be desorbed from the metal organic framework. The first portion of the hydrocarbons may then be collected.

In one or more embodiments, the adsorption and desorption steps may be accomplished by changes in pressure. In one or more embodiments, the adsorption and desorption steps may be accomplished by changes in temperature. In further embodiments, the adsorption and desorption steps may be accomplished by changes in both temperature and pressure.

In one or more embodiments, a chemical stream which is subject to kinetic separation may include a first portion of hydrocarbons and a second portion of hydrocarbons. The first portion of the hydrocarbons may comprise alkenes, and the second portion of the hydrocarbons may comprise alkanes. As described herein, alkenes are unsaturated hydrocarbons that contain at least one carbon-carbon double bond. Alkanes are saturated hydrocarbons that contain only single carbon-carbon bonds.

In one or more embodiments, the hydrocarbons that are subject to separation may comprise C1-C5 alkanes and C1-C5 alkenes. In one or more embodiments, the hydrocarbons may comprise least 50 mol. %, at least 60 mol. %, at least 70 mol. %, at least 80 mol. %, at least 90 mol. %, at least 95 mol. %, at least 99 mol. %, or even at least 99.9 mol. % of the combination of C1-C5 alkanes and C2-C5 alkenes. As described herein, C1-C5 alkanes are alkanes that contain 1 to 5 carbon atoms, and C2-C5 alkenes are alkenes that contain 2 to 5 carbon atoms.

In further embodiments, the hydrocarbons may comprise ethane and ethylene. In one or more embodiments, the hydrocarbons may comprise least 50 mol. %, at least 60 mol. %, at least 70 mol. %, at least 80 mol. %, at least 90 mol. %, at least 95 mol. %, at least 99 mol. %, or even at least 99.9 mol. % ethane and ethylene.

In one or more embodiments, the ethylene/ethane diffusion selectivity of the metal organic framework material may be at least 5.6 when measured at a temperature of 298 K and a pressure of about 0.05 bar. For example, the ethylene/ethane diffusion selectivity may be at least 5.6, at least 5.7, at least 5.8, at least 5.9, at least 6.0, at least 6.1, at least 6.2, at least 6.3, at least 6.4, or even at least 6.5. As described herein, the ethylene/ethane diffusion selectivity is the ratio of the diffusion rate of ethylene into the metal organic framework material to the diffusion rate of ethane into the metal organic framework material. Without being bound by theory, a relatively great ethylene/ethane diffusion selectivity (e.g., at least 5.6) results in increased efficiency when the metal organic framework material is used in a kinetic separation process to separate ethylene and ethane.

In one or more embodiments, the metal organic framework material may have a solvent accessible volume of 10% to 20% per unit cell volume. For example, the solvent accessible volume per unit cell volume may be from 12% to 18%, from 14% to 17%, or from 15% to 16%. As described herein, the solvent accessible volume refers to the volume of the metal organic framework accessible to a probe with a 1.2 Å radius. Without being bound by theory, the solvent accessible volume of the metal organic framework material may affect the amount of constituents that can be adsorbed by the metal organic framework material and the rate of adsorption for certain constituents.

In one or more embodiments, the metal organic framework material may have an ethylene capacity from 0.4 mmol/g to 0.8 mmol/g after 90 seconds of equilibration at a temperature of 298 K and a pressure of 1 bar. For example, the metal organic framework material may have an ethylene capacity of 0.5 mmol/g to 0.7 mmol/g, or 0.55 mmol/g to 0.65 mmol/g, after 90 seconds of equilibration at a temperature of 298 K and a pressure of 1 bar. As described herein, ethylene capacity refers to the amount of ethylene that is able to adsorb to an amount of metal organic framework.

In one or more embodiments, the metal organic framework material may have an ethane capacity from 0.05 mmol/g to 0.3 mmol/g after 90 seconds of equilibration at a temperature of 298 K and a pressure of 1 bar. For example, the metal organic framework material may have an ethane capacity of from 0.10 mmol/g to 0.25 mmol/g, or from 0.15 mmol/g to 0.25 mmol/g, after 90 seconds of equilibration at a temperature of 298 K and a pressure of 1 bar. As described herein, the ethane capacity refers to the amount of ethane that is able to adsorb to an amount of metal organic framework.

In one or more embodiments, the metal organic framework material may have relatively good thermal stability at elevated temperatures. In one or more embodiments, the metal organic framework material may be thermally stable up to at least 500° C. For example, the metal organic framework material may be thermally stable at temperatures of at least 300° C., at least 400° C., at least 500° C., or even higher for sustained times such as 30 seconds, 1 minute, 30 minutes, 1 hour, or even longer. As described herein, a metal organic framework material may be thermally stabile at a given temperature for a given time if it does not substantially decompose and substantially maintains its separation performance.

EXAMPLES

The examples are representative of embodiments of the presently disclosed subject matter, and are not meant as limiting on the scope of the claims.

Example 1—Preparation of Exemplary MOF

A metal organic framework, referred to in the Examples herein as the "GT-18," was synthesized by dissolving zinc acetate dihydrate (0.805 g, 3.67 mmol) in a mixed solvent comprising DMF, ethanol, deionized water, and ammonium hydroxide (30%) (20 mL, 5:5:7.5:2.5 v/v). 1,2,3-benzotriazole (BTA) (1.029 g, 8.64 mmol) and benzimidazole (BIM) (0.256 g, 2.17 mmol) were slowly added to the zinc solution while the solution was stirred. The molar ratio of BTA to BIM was 80:20. The reaction mixture was left stirring at 150 rpm for 4 days at room temperature. GT-18 in the form of a white powder was obtained after centrifuging the reaction mixture. This powder was rinsed with DMF and washed with methanol 3 times a day for 2 days. The resulting GT-18 was activated at 200° C. under vacuum for 24 hours.

Example 2—Preparation of Metal Organic Framework Samples

Two comparative metal organic frameworks were formed using the process of Example 1 with various concentrations of BTA and BIM. BTA and BIM were added in molar ratios of 30:70 and 50:50. This process resulted in two comparative metal organic frameworks referred to as ZIF-7$M_{20}$ and ZIF-7$M_{46}$ respectively.

Example 3—Percentage of BTA and BIM Linkers in the GT-18 and Metal Organic Framework Samples $^1$H NMR spectra were obtained for the GT-18 prepared in Example 1 and the ZIF-7$M_{20}$ and ZIF-7$M_{46}$ prepared in Example 2. These NMR spectra are displayed in FIG. 1. The peaks displayed in FIG. 1 are labeled with stars and circles that correspond to the chemical structures of BIM and BTA included above the spectra. The peak intensities correspond to the concentration of the BTA and BIM linkers in the metal organic framework. In the ZIF-7M$_{20}$ spectrum, the peaks corresponding to the BIM linkers are larger than the peaks corresponding to the BTA linkers. The ratio of these peak intensities reveals that BTA linkers make up of 20 mol % of the total linkers in ZIF-7M$_{20}$. In the ZIF-7M$_{46}$ spectrum, the peaks corresponding to the BIM linkers are slightly larger than the peaks corresponding to the BTA linkers. The ratio of these peak intensities reveals that the BTA linkers make up 46 mol % of the total linkers in ZIF-7M$_{46}$. In the GT-18 spectrum, the BTA linker peaks are larger than the BIM linker peaks and the ratio of the peak intensities reveals that the BTA linkers make up 70 mol % of the linkers.

Example 4—Peak Shift in PXRD Pattern for GT-18

Figure 2:
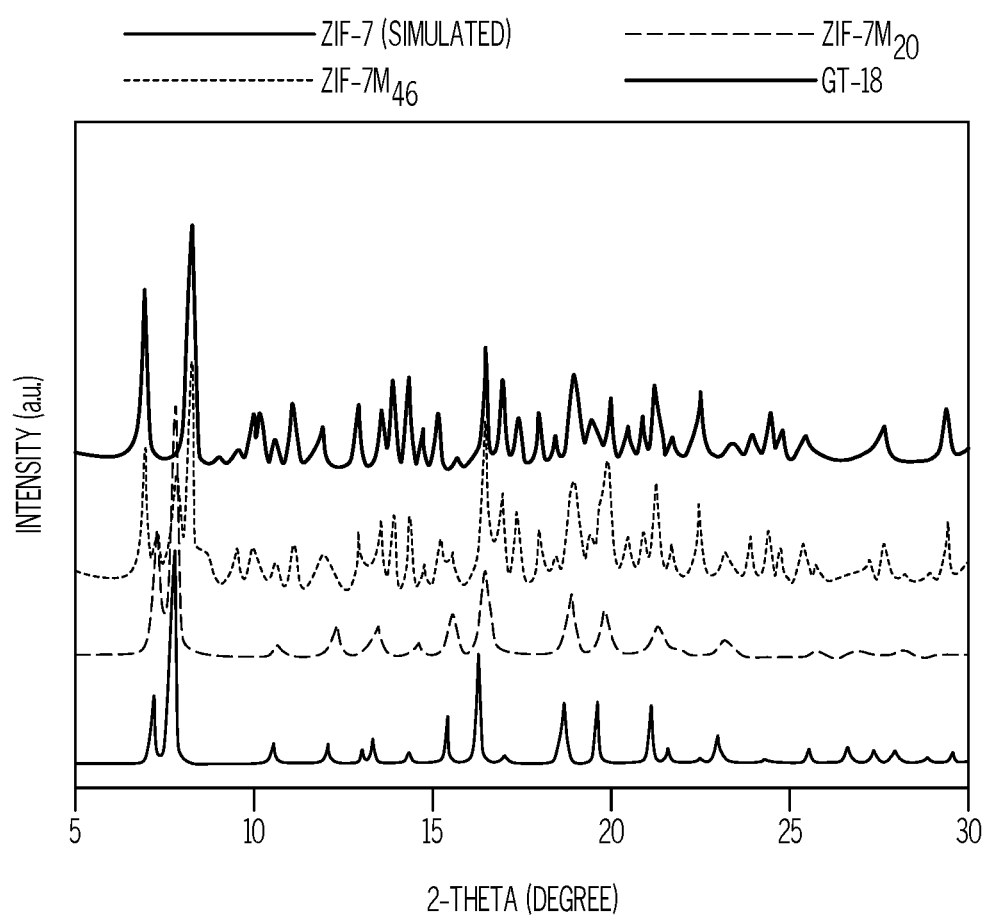
FIG. 2 depicts the PXRD patterns for the samples of Example 4, according to one or more embodiments shown and described herein.

PXRD patterns were obtained for GT-18, ZIF-7M$_{20}$, and ZIF-7M$_{46}$. These PXRD patterns are displayed in FIG. 2 along with a simulated PXRD pattern for ZIF-7. The peaks at about 7 and 8 degrees in the GT-18 PXRD pattern are shifted further apart than the peaks in the ZIF-7M$_{20}$ and ZIF-7M$_{46}$ samples and the ZIF-7 simulation. Additionally, the GT-18 pattern displays peaks from 10-30 degrees not observed in the ZIF-7 and ZIF-7M$_{20}$ patterns. The similarity between the PXRD patterns for ZIF-7M$_{20}$ and ZIF-7M$_{46}$ and the simulated PXRD pattern for ZIF-7 suggests that ZIF-7M$_{20}$ and ZIF-7M$_{46}$ have the same crystallographic structure as ZIF-7.

Example 5—Morphology of GT-18 Single Crystals

Figure 3A:
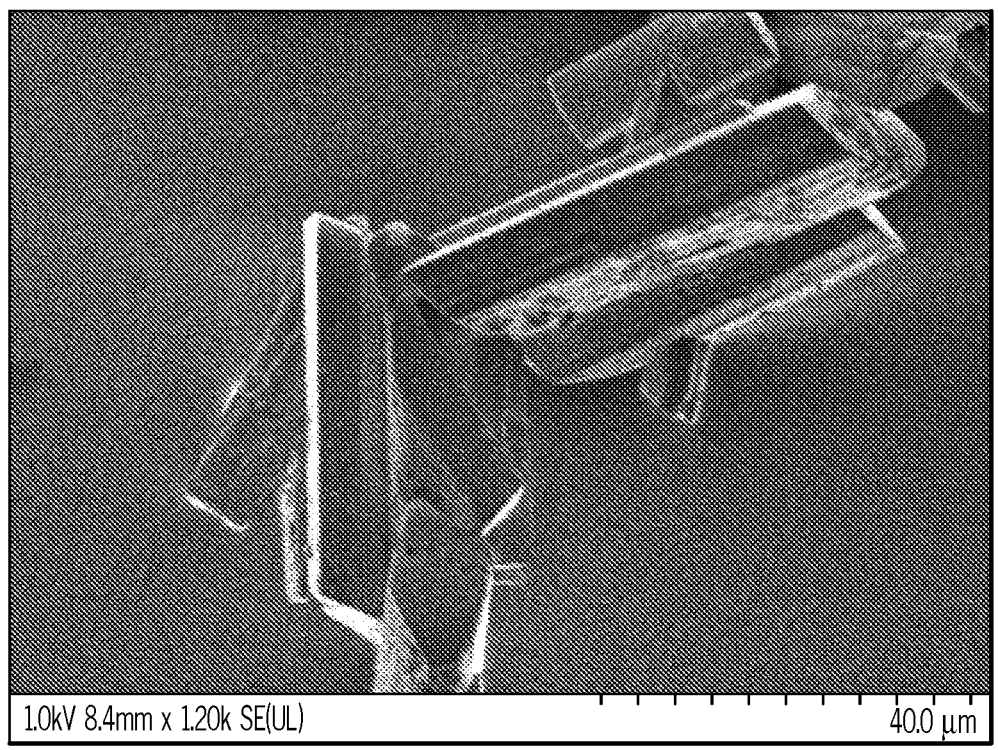
FIG. 3A depicts a scanning electron microscope image of the metal organic structure crystals of Example 5, according to one or more embodiments shown and described herein.
Figure 3B:
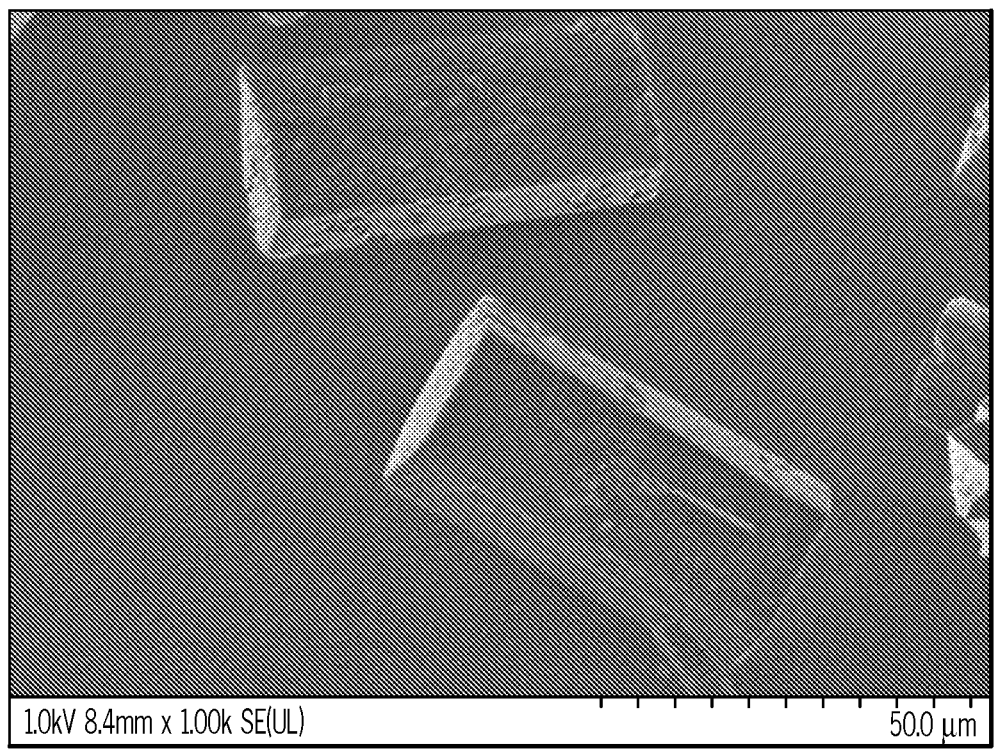
FIG. 3B depicts a scanning electron microscope image of the metal organic structure crystals of Example 5, according to one or more embodiments shown and described herein.

Single crystals of GT-18 were synthesized by dissolving zinc acetate dihydrate (0.323 g, 1.47 mmol) in a solvent comprising DMF, ethanol, deionized water, and ammonium hydroxide (30%) (8 mL, 2:2:3.5:1 v/v). BTA (0.206 g, 1.73 mmol) and BIM (0.052 g, 0.44 mmol) were added to the zinc solution. The molar ratio of BTA to BIM was 80:20. The solution was shaken briefly in a vial. Then the mixture was allowed to react for 6 days at room temperature. The single crystals of GT-18 were washed with DMF. Scanning electron microscope images of the GT-18 crystals contained in FIG. 3A and FIG. 3B show that the GT-18 crystals adopted a rod morphology.

Figure 4A:
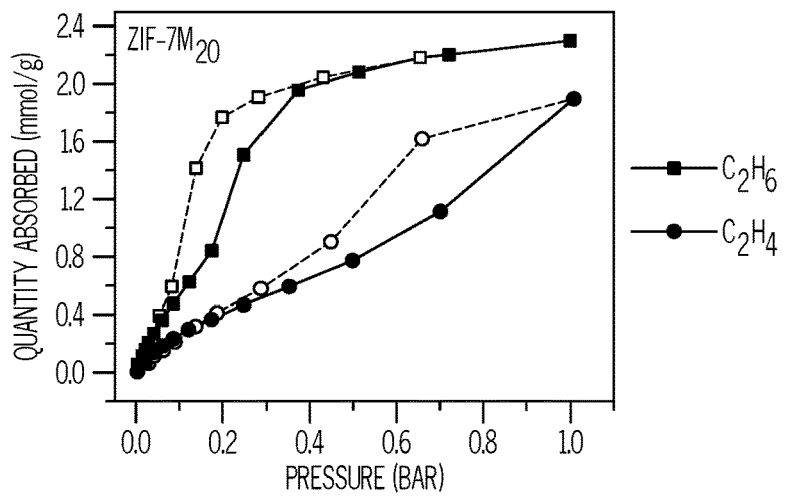
FIG. 4A plots the quantity of ethane and ethylene adsorbed by ZIF-7M$_{20}$ against pressure, according to one or more embodiments shown and described herein.
Figure 4B:
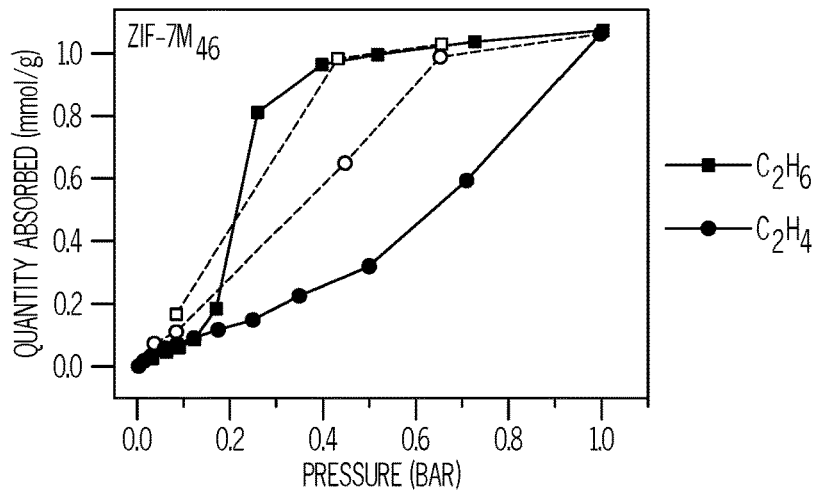
FIG. 4B plots the quantity of ethane and ethylene adsorbed by ZIF-7M$_{46}$ against pressure, according to one or more embodiments shown and described herein.
Figure 4C:
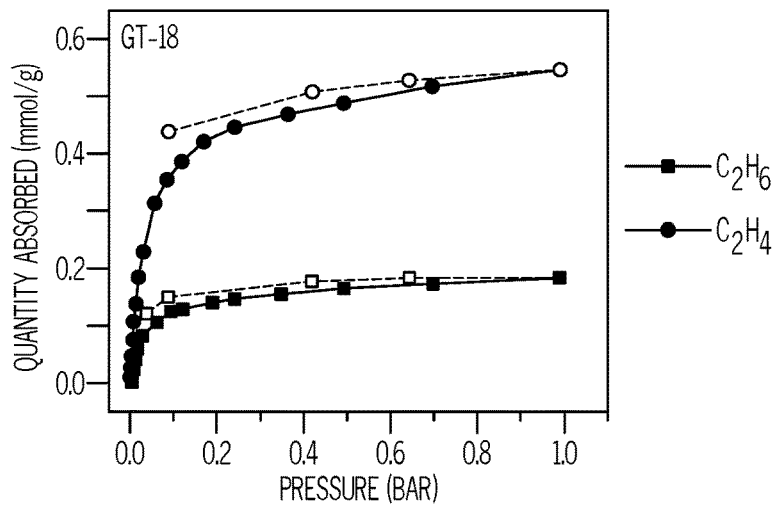
FIG. 4C plots the quantity of ethane and ethylene adsorbed by the presently disclosed metal organic structure against pressure, according to one or more embodiments shown and described herein.

Example 6—Ethylene and Ethane Adsorption Properties of GT-18, ZIF-7M$_{20}$, and ZIF-7M$_{46}$ The ability of ZIF-7M$_{20}$, ZIF-7M$_{46}$, and GT-18 to adsorb ethylene and ethane was determined at a temperature of 298 K. The adsorption isotherms are shown in FIG. 4A, FIG. 4B, and FIG. 4C respectively. Interestingly, at a pressure of 1 bar after a 90 second equilibrium interval, GT-18 displays an ethylene capacity of 0.6 mmol/g, which is three times higher than that of its ethane capacity (0.2 mmol/g). At those conditions, the ethylene capacity of ZIF-7M$_{20}$ was lower than the ethane capacity, and ZIF-7M$_{46}$ displayed equal ethylene and ethane capacities.

The ethane adsorption isotherms for ZIF-7M$_{20}$ and ZIF-7M$_{46}$ display a step like increase at a pressure of about 0.2 bar. This step like increase is evidence of a weak gate opening characteristic in the ZIF-7M$_{20}$ and ZIF-7M$_{46}$ metal organic frameworks. No similar step like increase was observed in either the ethane or the ethylene adsorption isotherms for GT-18 displayed in FIG. 4C. This suggests that the GT-18 metal organic framework does not exhibit gate opening characteristics.

Transient profiles at a temperature of 298 K and a pressure of 0.05 bar revealed that GT-18 displayed a high single-component ethylene/ethane diffusion selectivity of 6.8. At these conditions, the equilibrium uptake capacities for both ethylene and ethane are about 0.3 mmol/g. This indicates that there is no thermodynamic selectivity between ethane and ethylene, and that the adsorption isotherms in FIG. 4C should be treated as being at pseudo-equilibrium. The kinetic selectivity of other materials are displayed in Table 1. GT-18 has a higher kinetic selectivity between ethylene and ethane than other metal organic frameworks, which are limited to a kinetic selectivity of about 5.5.

TABLE 1

| Material | $C_2H_4/C_2H_6$ Kinetic Selectivity | Method |
| --- | --- | --- |
| GT-18 | 6.8 | Pressure decay |
| 33% Co$_2$(dobdc)/6FDA-DAM | 3.4 | Time-lag method |
| 25% Ni$_2$(dobdc)/6FDA-DAM | 3.6 | Time-lag method |
| ZIF-8 | 5.5 | IR microscopy |
| Mg-MOF-74 | 0.5 | Pressure decay |

Example 7—Ethylene and Ethane Adsorption Properties of ZIF-7 and ZIF-7M

As a comparative study, the ethane and ethylene adsorption properties of ZIF-7 and ZIF-7M were determined. ZIF-7M was prepared by performing ligand exchange for 5, 7, and 12 days. This resulted in ZIF-7M that contained approximately 17 mol %, 26 mol %, and 52 mol % BTA respectively. BTA content was determined by $^1$H NMR as described in Example 3. The adsorption properties of ethane and ethylene were measured at a temperature of 298 K. The ethane and ethylene adsorption results are displayed in FIG. 11A and FIG. 11B respectively.

Figure 11A:
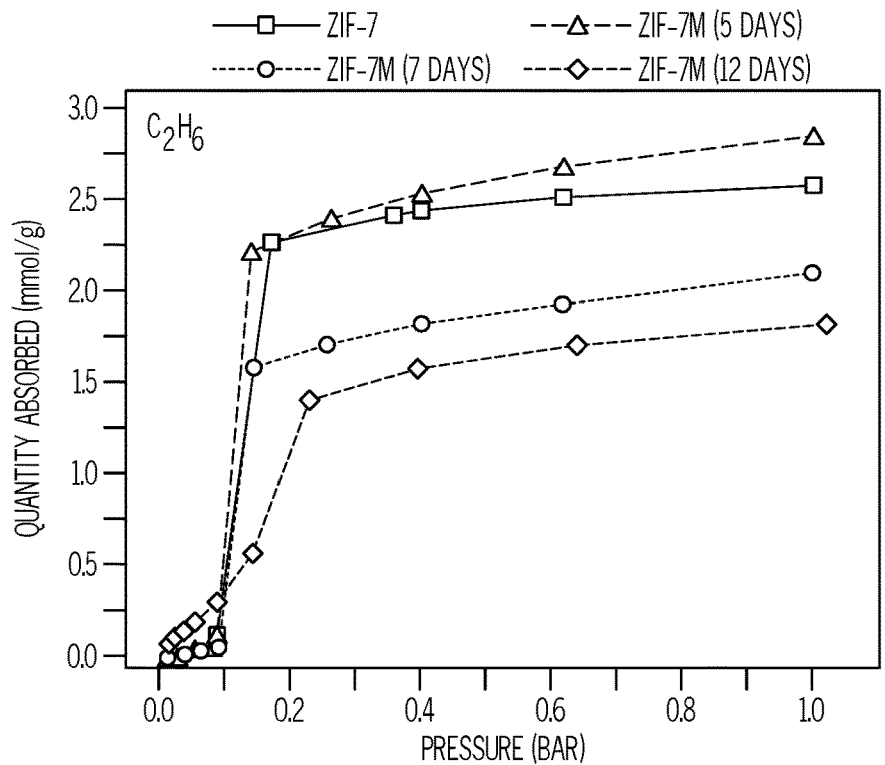
FIG. 11A plots the quantity of ethane adsorbed by the samples of Example 7 against pressure, according to one or more embodiments shown and described herein.
Figure 11B:
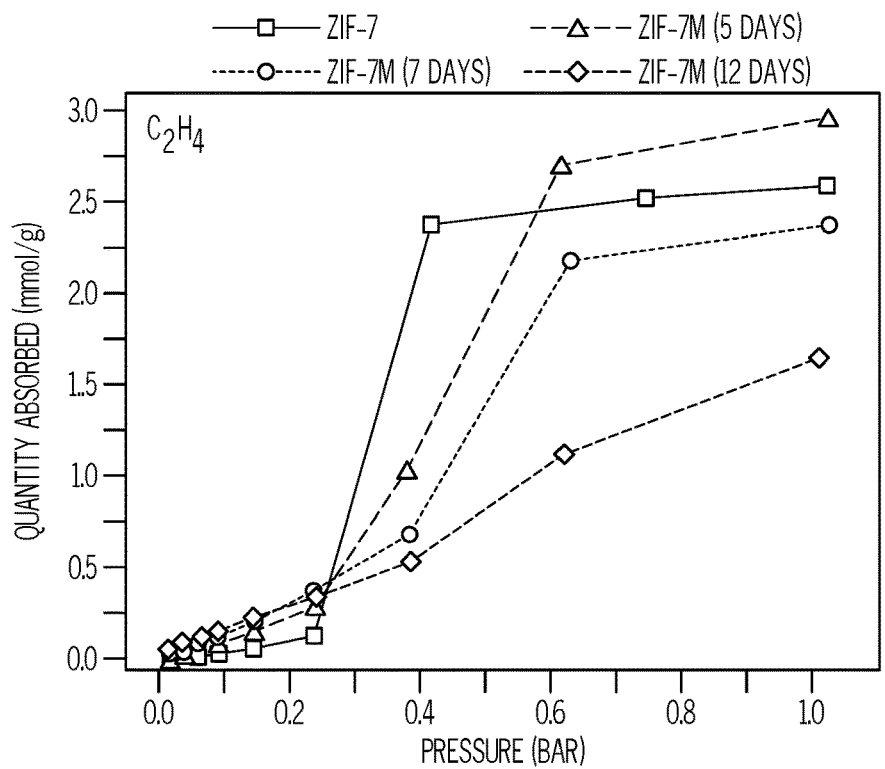
FIG. 11B plots the quantity of ethylene adsorbed by the samples of Example 7 against pressure, according to one or more embodiments shown and described herein.

The ethane isotherms displayed in FIG. 11A each contain a step at a pressure of about 0.1 bar. Additionally, the ethylene isotherms displayed in FIG. 11B each display a step at a pressure of about 0.2 bar to about 0.4 bar. The step like increases in the quantity of ethane or ethylene adsorbed are evidence of gate opening characteristics in each of the ZIF-7 compounds. Interestingly, the gate opening characteristics increased in the ZIF-7 samples with higher BTA content. This is different from the GT-18 sample tested in Example 6 that has a high BTA content (70 mol %) but exhibits no gate opening characteristics.

Example 8—Crystallographic Structure of GT-18

Figure 6:
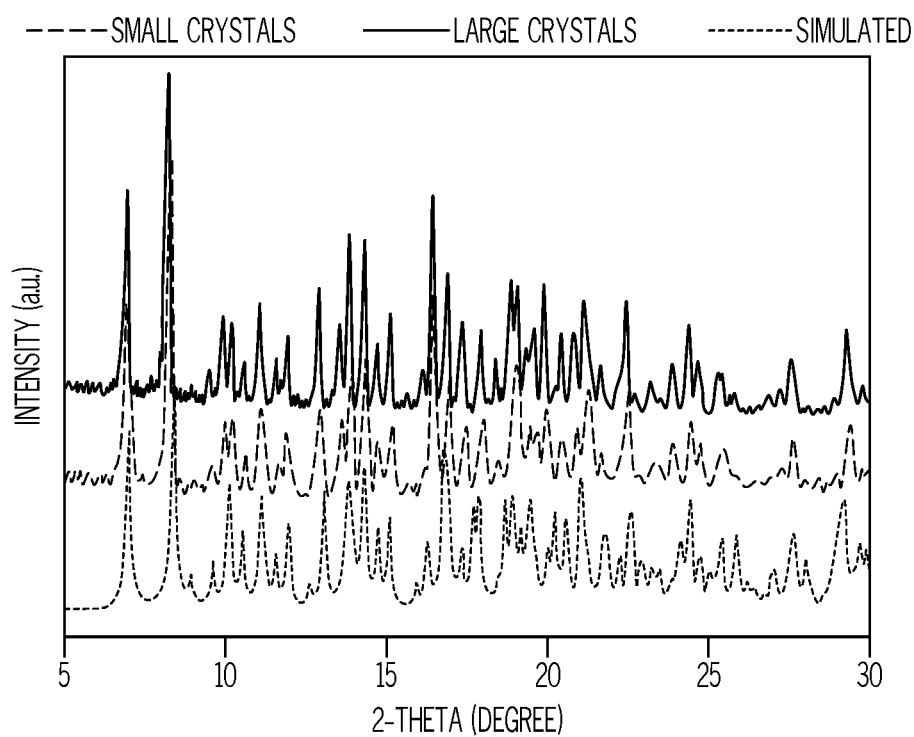
FIG. 6 depicts experimentally obtained PXRD patterns of the presently disclosed metal organic structure crystals and a simulated PXRD pattern of the presently disclosed metal organic structure crystals, according to one or more embodiments shown and described herein.

The crystallographic structure of GT-18 was determined by analyzing the $^1$H NMR data and PXRD data collected from samples of the crystals described in the previous Examples. Experimental PXRD patterns were compared to simulated PXRD patterns. FIG. 6 displays the PXRD patterns of small GT-18 crystals from Example 1, large GT-18 crystals from Example 5, and a simulated PXRD pattern of GT-18 crystals. Slight peak shifts were observed between the simulated and experimental PXRD patterns. It is believed that this was probably due to the presence of solvent molecules during the single crystal analysis and the difference in thermal parameters during measurements. The experimental PXRD data was collected at room temperature, about 298 K, while the simulated PXRD data was generated from single crystal data collected at about 100 K. Apart from a slight peak shift, the simulated PXRD pattern matched the experimentally obtained patterns, suggesting the production of pure GT-18 crystals.

Figure 7:
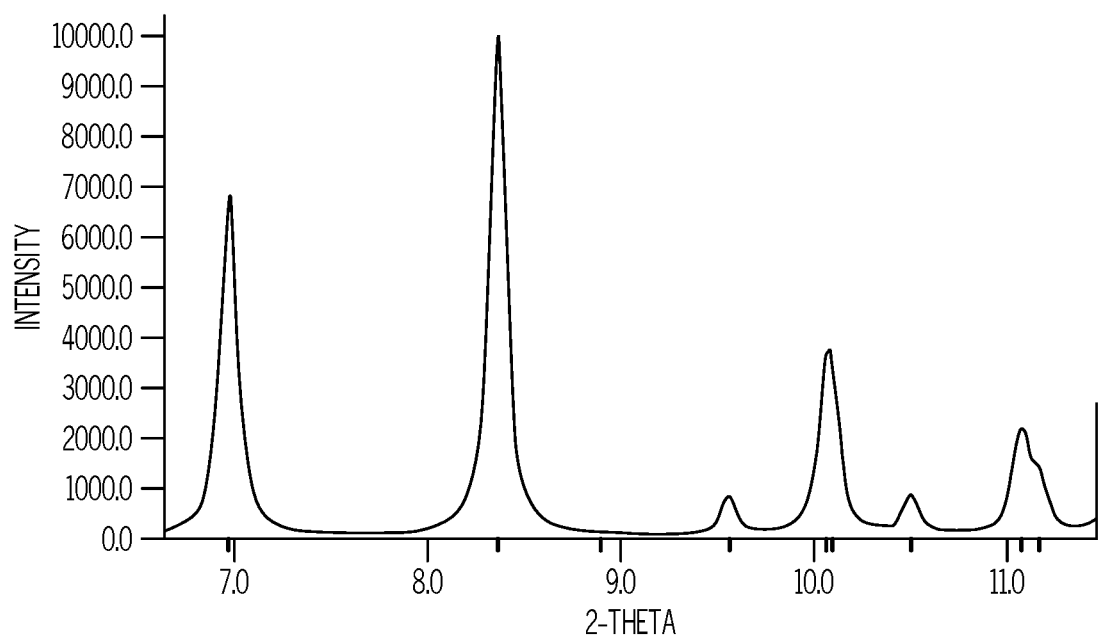
FIG. 7 depicts a simulated PXRD pattern for the presently disclosed metal organic structure, according to one or more embodiments shown and described herein.
Figure 8:
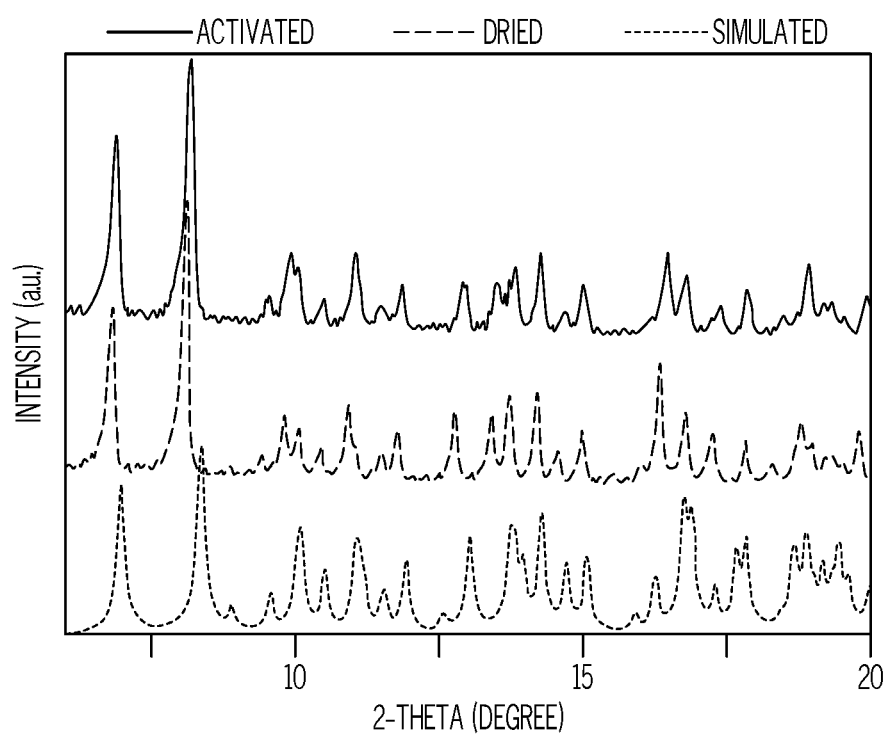
FIG. 8 depicts experimentally obtained PXRD patterns of the presently disclosed metal organic structure crystals and a simulated PXRD pattern of the presently disclosed metal organic structure crystals, according to one or more embodiments shown and described herein.

FIG. 7 displays a simulated PXRD pattern of GT-18 crystals generated using Mercury software. The small bars under the simulated intensity profile indicate the 2θ values at which peaks can occur given the unit cell dimensions and space group. However, these peaks may be too weak to show in the profile. In particular, the singlet peak observed in the 10° 2θ region represents 101 and 012 (hkl) reflections, as shown by the two small, vertical bars underneath the peak. This corresponds well to the doublet peak observed at the 10° 2θ region in the experimental PXRD patterns, as shown in FIG. 8. The experimental PXRD patterns for dried and activated GT-18 as well as the simulated PXRD pattern for GT-18 are displayed in FIG. 8. A slight peak shift between the dried and activated PXRD patterns indicates the slightly flexible nature of the GT-18 metal organic framework material.

Lattice parameters for the GT-18 metal organic framework material were obtained using the experimental PXRD data and the Rietveld refinement method. This data was compared to the lattice parameters obtained from the single crystals of GT-18 described in Example 5, and the data is displayed in Table 2. Additionally, Table 3 contains crystal data and structure refinement data for the GT-18 metal organic framework material.

TABLE 2

| Space group | Single crystal P2$_1$ | Rietveld refinement of simulated PXRD pattern P2$_1$ |
| --- | --- | --- |
| a/Å | 9.96450(10) | 9.9116(12) |
| b/Å | 15.83910(10) | 15.8372(22) |
| c/Å | 21.1899(2) | 21.483(3) |
| α/° | 90 | 90 |
| β/° | 94.0260(10) | 93.947(11) |
| γ/° | 90 | 90 |
| Fitting Quality | Rexp = 0.0709 Rp = 0.1316 wRp = 0.167 | Final R indexes [I> = 2σ (I) = R1 = 0.0407, wR2 = 0.095 Final R indexes [all data] = R1 = 0.0448, wR2 = 0.0983 Goodness-of-fit on F$^2$ = 1.039 |

TABLE 3

| Empirical formula | C$_{66}$H$_{50}$N$_{28}$OZn$_5$ |
| --- | --- |
| Formula weight | 1578.19 |
| Temperature/K | 104(1) |
| Crystal system | monoclinic |
| Space group | P2$_1$ |
| a/Å | 9.96450(10) |
| b/Å | 15.83910(10) |
| c/Å | 21.1899(2) |
| α/° | 90 |
| β/° | 94.0260(10) |
| γ/° | 90 |
| Volume/Å$^3$ | 3336.12(5) |
| Z | 2 |
| ρ$_{calc}$g/cm$^3$ | 1.571 |
| μ/mm$^{-1}$ | 2.552 |
| F(000) | 1600.0 |
| Crystal size/mm$^3$ | 0.085 × 0.057 × 0.031 |
| Radiation | CuKα (λ = 1.54184) |
| 2Θ range for data collection/° | 6.974 to 152.75 |
| Index ranges | −11 ≤ h ≤ 12, −19 ≤ k ≤ 13, −26 ≤ l ≤ 26 |
| Reflections collected | 24553 |
| Independent reflections | 10214 [R$_{int}$ = 0.0468, R$_{sigma}$ = 0.0566] |
| Data/restraints/parameters | 10214/44/920 |
| Goodness-of-fit on F$^2$ | 1.039 |
| Final R indexes [I> = 2σ (I)] | R$_1$ = 0.0407, wR$_2$ = 0.0958 |
| Final R indexes [all data] | R$_1$ = 0.0448, wR$_2$ = 0.0983 |
| Largest diff. peak/hole /e Å$^{-3}$ | 0.77/−0.60 |
| Flack parameter | 0.02(2) |

As disclosed in Tables 2 and 3, GT-18 crystallizes in a P2$_1$ space group, and the P2$_1$ space group belongs to the monoclinic crystal system. This structure is distinct from ZIF-7, which crystallizes in a R3 space group, belonging to the trigonal crystal system. As discussed in Example 4, ZIF-7M$_{20}$ and ZIF-7M$_{46}$ share the crystallographic structure of ZIF-7 and therefore crystallize in the R3 space group, belonging to the trigonal crystal system.

Figure 5A:
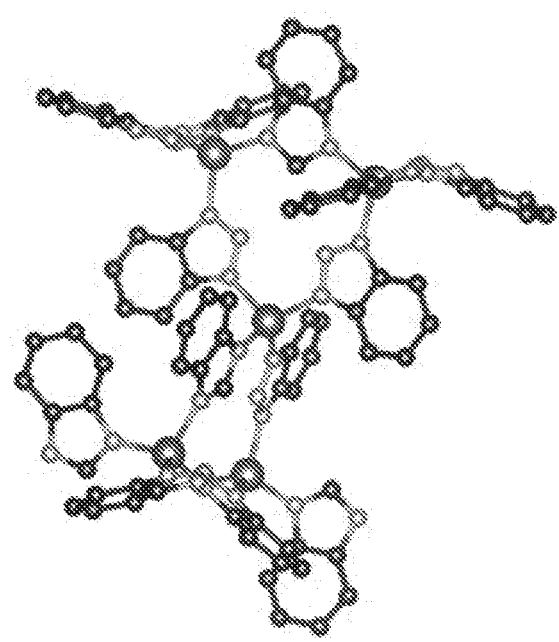
FIG. 5A schematically depicts the coordination environment of the zinc nodes in the presently disclosed metal organic structure crystal structure, according to one or more embodiments shown and described herein.

The GT-18 crystals have a flack parameter of 0.02(2), which indicates the homochirality of the single crystal structure. FIG. 5A displays the coordination environment of the zinc nodes in the chiral framework. In GT-18, the zinc ions have a coordination number of 4 and are connected by at least one of two azolate linkers, BTA and BIM. The GT-18 metal organic framework material consists of 5 zinc-azolate units, and each zinc node is 4-coordinated to varying mixtures of the BTA and BIM linkers. The zinc-azolate units contain 7 BTA linkers per 10 linkers, which corresponds to the $^1$H NMR results displayed in FIG. 1 and discussed in Example 3.

Figure 5B:
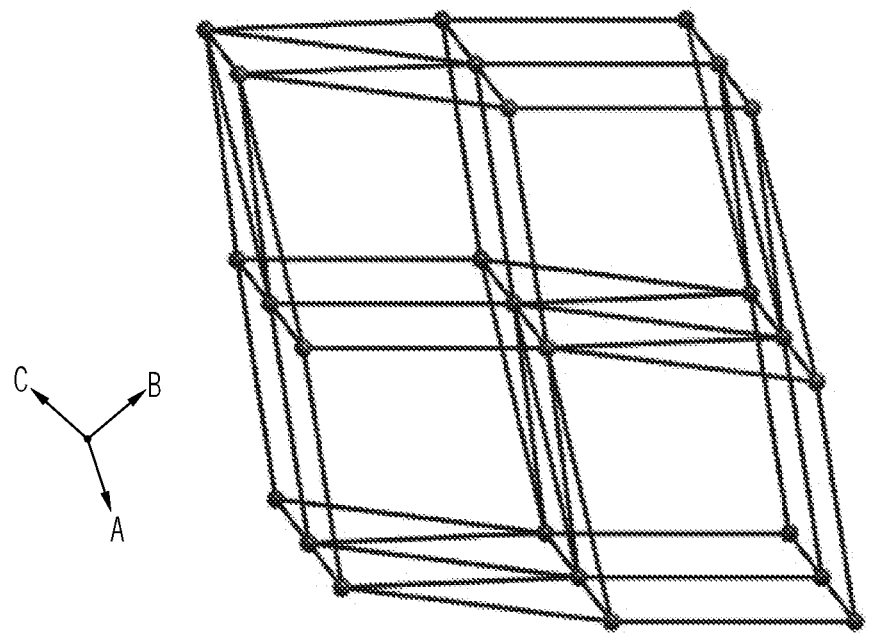
FIG. 5B schematically depicts the structure of the presently disclosed metal organic structure as a uninodal 8-connected ecu network, according to one or more embodiments shown and described herein.

The GT-18 metal organic framework material is not part of the zeolitic imidazolate framework (ZIF) family due to the absence of a 145° metal-imidazolate-metal angle. As shown in Tables 2 and 3, the α, β, and γ angles of GT-18 are approximately 90°, 94°, 90° respectively. In GT-18, one of the zinc-azolate units acts as a twisted strut, with a twist angle of almost 90° between the two central planes that connect pairs of zinc-azolate units. The orientation of the twisted struts alternates along the c-axis, arranging the bridged zinc-azolate units into zig-zag chains, which may facilitate structural chirality. This structure is apparent in FIG. 5B, which depicts GT-18 as a uninodal 8-connected ecu network.

Figure 5C:
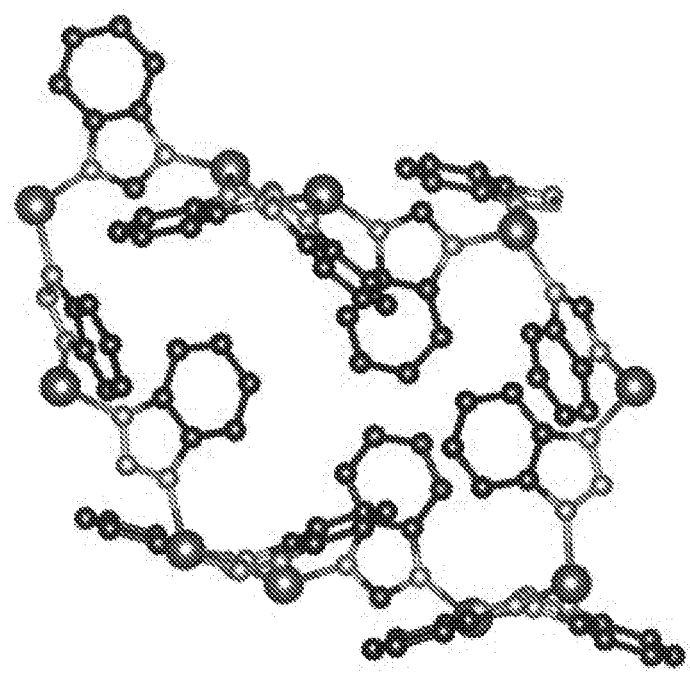
FIG. 5C schematically depicts a pore opening of the presently disclosed metal organic structure crystal structure, according to one or more embodiments shown and depicted herein.
Figure 5D:
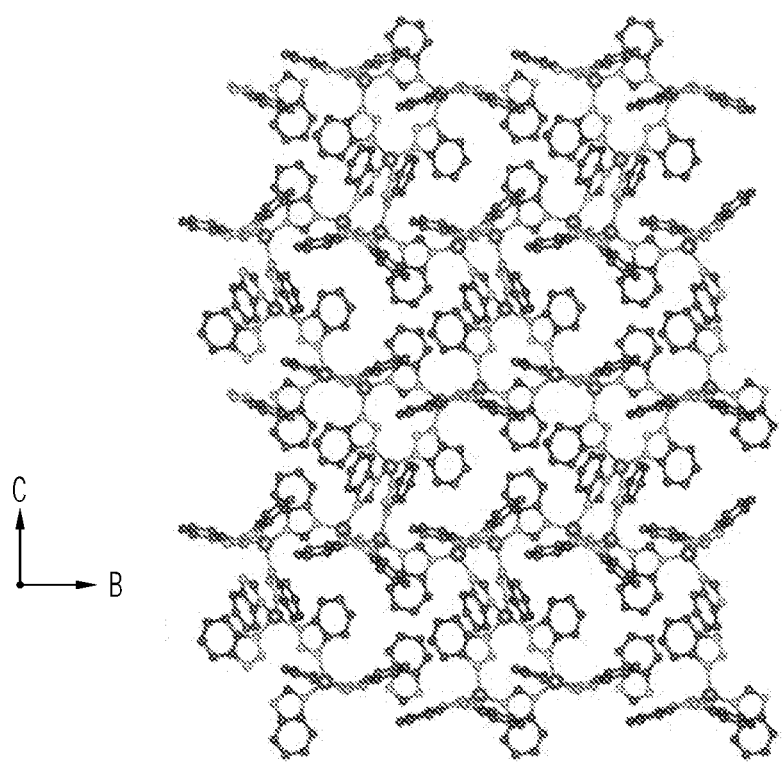
FIG. 5D schematically depicts the largest channel in the presently disclosed metal organic structure crystal structure, according to one or more embodiments shown and depicted herein.
Figure 5E:
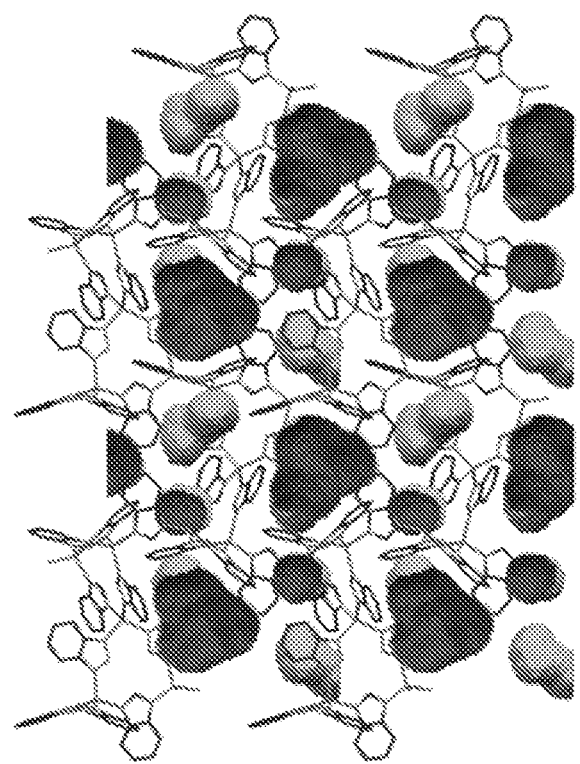
FIG. 5E schematically depicts the accessible volumes within the presently disclosed metal organic structure crystal structure, according to one or more embodiments shown and depicted herein.

The crystal structure of the GT-18 metal organic framework material was mapped using a probe with a 1.2 Å radius. The GT-18 crystal displays a low solvent accessible volume of 10.7% per unit cell volume. This explains the low gas uptake capacities in the adsorption measurements performed in Example 6. FIG. 5E displays the accessible volumes within the crystal structure. Discrete voids can be seen within the lattice, indicating the lack of channels large enough for the passage of guest molecules. Nevertheless, DMF solvent molecules can be located inside the void of the framework, which suggests the presence of pore flexibility.

The GT-18 crystals contained an egg-shaped cage, with a cavity diameter of 7 Å. This cavity is constructed from 27 zinc nodes that are connected by 34 azolate linkers. The cage features a 10 membered-ring pore opening along the a-axis, where 4 of the azolate linkers had the benzene rings pointing directly into the pore opening. This lead to a significant narrowing of the pore aperture to a diameter of about 3 Å. The structure of the pore opening is displayed in FIG. 5C. Additionally, the structure of the GT-18 crystals along the a-axis are displayed in FIG. 5D to show the largest channel in the structure.

Example 9—Thermal Stability of GT-18

Figure 9A:
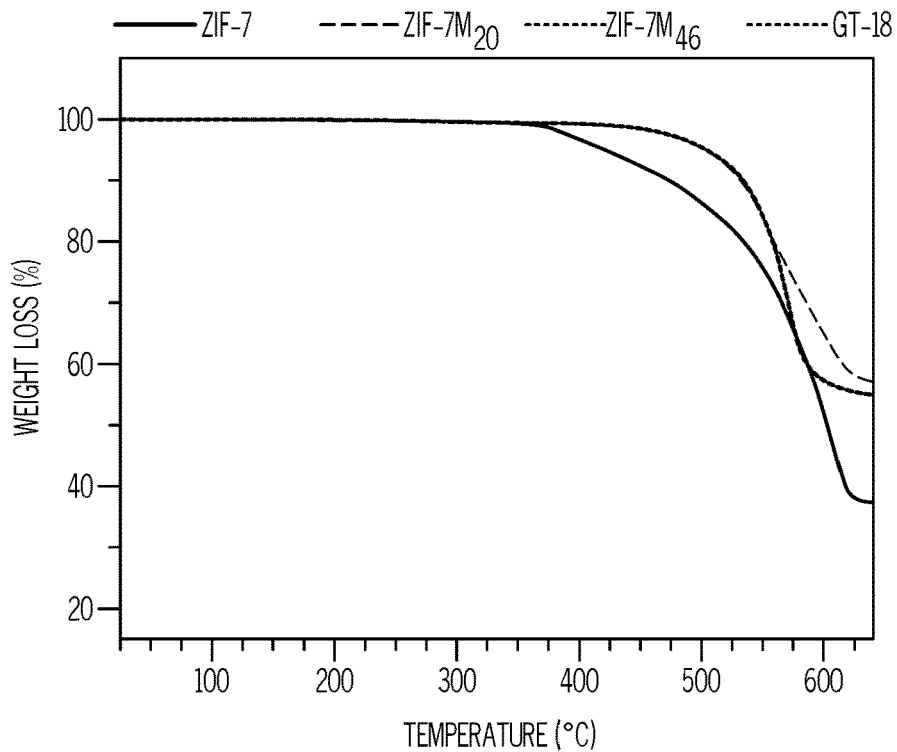
FIG. 9A plots the percentage of weight lost for the samples of Example 9 against temperature, according to one or more embodiments shown and described herein.
Figure 9B:
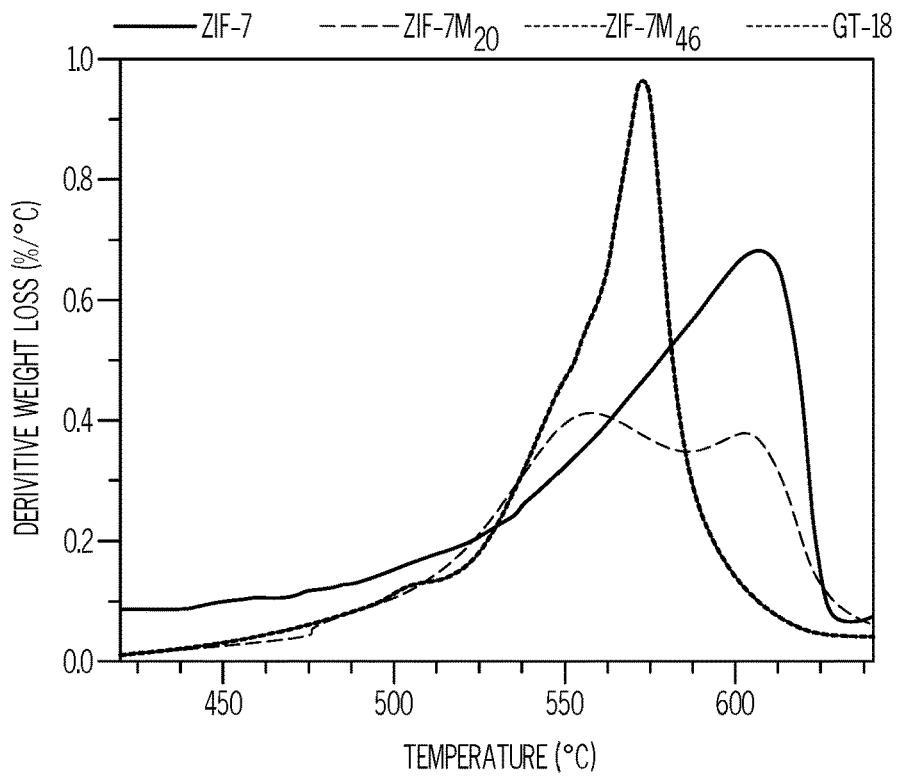
FIG. 9B plots the derivative weight lost in percent per degree Celsius for the samples of Example 9 against temperature, according to one or more embodiments shown and described herein.

GT-18, ZIF-7, ZIF-7M$_{20}$, and ZIF-7M$_{46}$ were subjected to thermogravimetric analysis. FIG. 9A displays the results of the thermogravimetric analysis. The metal organic framework materials were thermally stable up to 500° C., where decomposition started. FIG. 9B displays the derivative thermogravimetric results. FIG. 9B shows sharp decomposition peaks at about 570° C. for ZIF-7M$_{46}$ and GT-18. ZIF-7 had a sharp decomposition peak at 610° C. ZIF-7M$_{20}$ had two decomposition peaks at 560° C. and 605° C. suggesting a mixture of metal organic framework materials in the ZIF-7M$_{20}$ sample.

Example 10—Stability of GT-18 in Water

Figure 10:
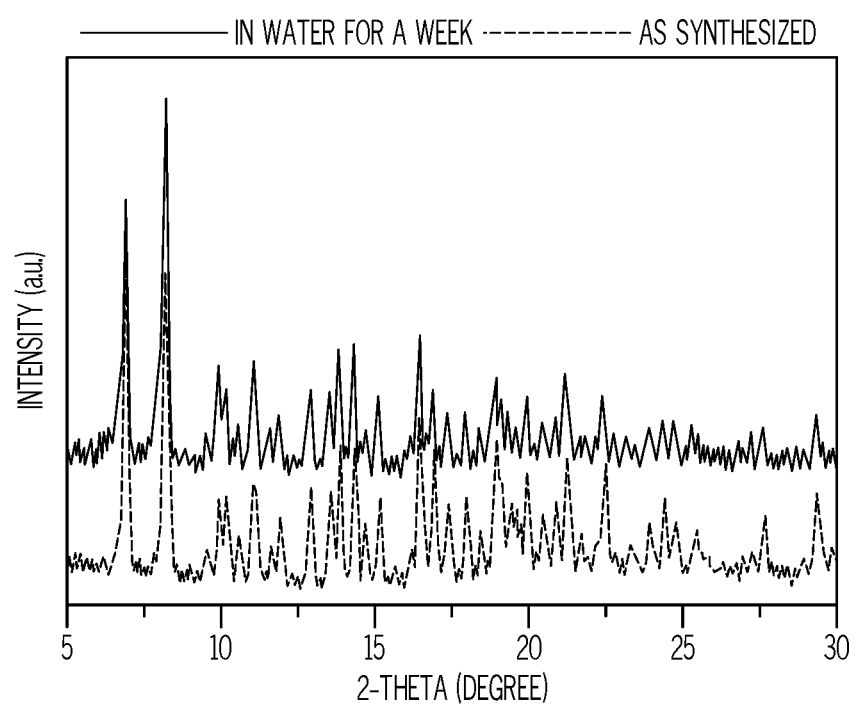
FIG. 10 depicts the PXRD patterns for the samples of Example 10, according to one or more embodiments shown and described herein.

To determine its stability in water, a sample of GT-18 was immersed in water at room temperature for one week. After one week, the PXRD pattern of the GT-18 was obtained. The PXRD pattern is displayed in FIG. 10. The PXRD pattern for the GT-18 that was submerged in water for a week has sharp peaks and no obvious peak shifts, suggesting that GT-18 is stable in water.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the present invention without departing from the spirit and scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

The invention claimed is:

1. A metal organic framework material suitable for the kinetic separation of hydrocarbons, the metal organic framework material comprising:
   metal ions;
   one or more triazoles; and
   one or more imidazoles, wherein at least a portion of imidazoles are benzimidazole;
   wherein at least a portion of the metal ions are coordinated by the one or more triazoles and the one or more imidazoles such that at least a portion of the metal organic framework material forms a crystalline structure belonging to a monoclinic crystal system.

2. The metal organic framework of claim 1, wherein the metal ions are center constituents of the metal organic framework, and the one or more triazoles and one or more imidazole are linkers in the metal organic framework.

3. The metal organic framework material of claim 1, wherein at least a portion of the triazoles are 1,2,3-benzotriazole.

4. The metal organic framework material of claim 1, wherein at least a portion of the metal ions are zinc ions.

5. The metal organic framework material of claim 1, wherein at least a portion of the metal organic framework material forms a crystalline structure belonging to the P2$_1$ space group.

6. The metal organic framework material of claim 1, wherein at least a portion of the metal organic framework material forms a crystalline structure that has a rod morphology.

7. The metal organic framework material of claim 1, wherein at least a portion of the metal ions are coordinated by the one or more triazoles and the one or more imidazoles such that the metal ions have a coordination number of 4.

8. The metal organic framework material of any of claim 1, wherein the molar ratio of the one or more triazoles to the one or more imidazoles is from 60:40 to 80:20.

9. A method for the kinetic separation of hydrocarbons, the method comprising:
   contacting hydrocarbons with a metal organic framework material such that a first portion of the hydrocarbons are adsorbed by the metal organic framework material and a second portion of the hydrocarbons are not adsorbed by the metal organic framework;
   wherein the metal organic framework material comprises:
   metal ions;
   one or more triazoles; and
   one or more imidazoles, wherein at least a portion of imidazoles are benzimidazole;
   wherein at least a portion of the metal ions are coordinated by the one or more triazoles and the one or more imidazoles such that at least a portion of the metal organic framework material forms a crystalline structure belonging to a monoclinic crystal system.

10. The method of claim 9, wherein the first portion of the hydrcarbons comprises alkenes, and the second portion of the hydrocarbons comprises alkanes.

11. The method of claim 9, wherein the hydrocarbons comprise C2-C5 alkanes and C2-C5 alkenes.

12. The method of claim 9, wherein the hydrocarbons comprise ethane and ethylene.

13. The method of claim 9, wherein the metal ions are center constituents of the metal organic framework, and the one or more triazoles and one or more imidazoles are linkers in the metal organic framework.

14. The method of claim 9, wherein at least a portion of the one or more triazoles are 1,2,3-benzotriazole.

15. A metal organic framework material suitable for the kinetic separation of hydrocarbons, the metal organic framework material comprising:
   zinc ions;
   1,2,3-benzotriazole;
   and benzimidazole;
   wherein:
   at least a portion of the zinc ions are coordinated by the 1,2,3-benzotriazole and the benzimidazole such that at least a portion of the metal organic framework material forms a crystalline structure belonging to a monoclinic crystal system;
   the molar ratio of 1,2,3-benzotriazole to benzimidazole is from 65:35 to 75:25; and
   at least 95 wt. % of the metal organic framework material is a combination of the zinc ions, the 1,2,3-benzotriazole, and the benzimidazole.

* * * * *